Patented Sept. 7, 1943

2,329,045

UNITED STATES PATENT OFFICE 2,329,045

PHENOL-ALDEHYDE MODIFICATION

Samuel S. Gutkin, Brooklyn, N. Y., assignor to Falk & Company, a corporation of Pennsylvania No Drawing. Application November 27, 1939, Serial No. 306,291

4 Claims. (Cl. 260—20)

This invention relates to a specialized resinous phenol-aldehyde-alkyd product.

My purpose is so to link the alkyd reactions, and the typical modifying reactions for alkyd resins to a simple phenol-aldehyde condensate as to give a resinous product, primarily alkyd in type, which possesses advantages, such as the capacity to acquire gloss, hardness and infusibility normally possessed by the phenolic condensation products. Beginning by making a phenol-aldehyde condensate having primarily full heat-hardening properties (i. e., a "Bakelite" type phenol-aldehyde condensate), I produce a mixed resinous product, which exhibits a high order of gelation and high alkali resistance, and which combines the general properties characteristic of a phenol-aldehyde resin of the "Bakelite" type with the typically alkyd characteristics of flexibility, durability, and susceptibility to modification.

This purpose I primarily effect by effecting a phenol-aldehyde condensation between a phenol of low molecular weight and an aldehyde to produce a condensate; then esterifying this condensate before it hardens, together with a polyhydric alcohol, by reaction with a polybasic carboxylic acid; and then, by careful addition of an unsubstituted monocarboxylic acid, modifying the resultant resinous product of condensation and partial esterification.

I may exemplify my process as follows:

Example No. 1

300 grams of formaldehyde and 221 grams of meta-paracresol with 3.5 c. c. sodium hydroxide catalyst, in a concentration of 250 milligrams per c. c. were mixed. The mixture was refluxed until a resinous layer dropped out with separation of water, which water was drawn off.

Taking 50 grams of the condensate thus formed, and prior to any additional heating of the condensate, I mixed with it 154 grams of high test glycerin, forming a homogeneous mass. I then added 148 grams of phthalic anhydride, and brought the temperature of the mixture to about 320° F. The resultant product, when subjected to continued heating at higher temperature and allowed to gel, was a clear resinous material of molding and casting type, but less brittle than the simple phenol-formaldehyde resin which it contained.

Example No. 2

To the product of partial esterification produced by reacting the phthalic anhydride with a mixture of condensate and glycerin, brought to a clear bead and without permitting this material to gel, I added in situ 76 grams of fatty acids from linseed oil during a period of twenty minutes, while raising the temperature of the reaction mixture to a maximum of 380° F. The temperature was then raised to 430° F., and during a period of one and one-half hours I added in small increments a total of 484 grams of fatty acids from linseed oil. The mass was held at a temperature of 430° F. for a period of one hour for the purpose of bodying. The total yield was 821 grams of oleoresinous product.

The resinous product, so produced, is soluble in acetic acid, in the lacquer diluent solvents, such as ethyl acetate, cellusolve, and in toluol mixtures. It forms a distensible film, which is air-hardening. A film of this oleoresinous material couples an adhesion characteristic of the alkyd resins with hardness and alkali resistance characteristic of the type of phenol-aldehyde resin incorporated in it.

Example No. 3

To 100 grams of the resin produced by the procedure of Example No. 2, at 430° F., brought to a clear bead and before gelation of the resin, I slowly added 100 grams of linseed oil. The temperature of the mixture was maintained at 430° F. during addition of the oil.

The resultant product was an oleoresinous body, soluble in oil and suitable for use in lacquers, and suitable generally as a film-forming material capable of forming a highly distensible, air-hardening film.

It will be seen from the above that, beginning with a phenol-aldehyde condensation product of full heat-hardening and alkali resistant type, this product is given alkyd qualities and capacity to partake in the alkyd modifications. In each form of the product, as exemplified by Examples Nos. 1, 2 and 3, the product possessed good resistance to alkalies and showed gelation of high order. It exhibited a hardness and gloss not to be expected of the purely alkyd resins. The following examples illustrate variations in procedure, and in materials, the fundamental principles of the invention being, however, embodied in each of them.

Example No. 4

Taking 148 grams of phthalic anhydride I melted this material, and then added to and mixed with it 154 grams of high test glycerin, and 50 grams of phenol-formaldehyde condensate formed as in Example No. 1 which had not been permitted to harden. The temperature was brought to about 320° F. At this stage, this procedure being analogous to that of Example No. 1, the procedures of Example No. 2 and Example No. 3 may successively be performed, if it is desired to obtain products analogous to those obtained by following the procedure of those examples. If it is desired to recover an unmodified phenol-aldehyde-alkyd resin, I continue heating the reaction mixture, without addition of other ingredients until gelation takes place, desirably raising the temperature during heating to somewhat above 320° F.

As compared with the procedure of Example No. 1, the procedure of this present example is preferred because it provides for dehydration under more favorable conditions.

Example No. 5

Taking 50 grams of phenol-aldehyde condensate, produced in Example No. 1 and ungelled, I added to it 93 grams of high test glycerin and 148 grams of phthalic-anhydride, bringing the temperature to about 320° F. Heating was continued until a clear bead was formed, and while maintaining the temperature, I added over a period of 15 minutes 37 grams of acetic acid. Upon gelling by continued heating after addition of the acetic acid, there was obtained a clear resinous product soluble in aromatic hydrocarbons, and the lacquer solvents, but insoluble in oils.

As a variant under Example No. 5, linseed oil, or its equivalent, may be added to the resin modified by the addition of acetic acid, in the manner of Example No. 3, without carrying the mass to gelation prior to the addition of the oil. Such oil-modified resin is similarly oil-soluble.

Example No. 6

Taking 50 grams of phenol-aldehyde condensate produced as in Example No. 1 and ungelled, I added to it 93 grams of high test glycerin and 148 grams of phthalic anhydride, bringing the temperature to 320° F. When the mixture formed a clear bead, but prior to gelation, I added slowly over a period of 15 minutes, while maintaining the temperature, 76 grams of benzoic acid. If carried to a gel, the product is substantially identical with that obtained in Example No. 5, and if modified by addition of linseed oil, or its equivalent, the product is substantially identical with that obtained by oil modification of Example No. 5.

Example No. 7

In this example I mixed 300 grams of formaldehyde with 215 grams of phenol (carbolic acid), together with 11 c. c. of a sodium hydroxide solution catalyst having a concentration of 250 milligrams per c. c. The mixture was refluxed and a resinous layer dropped out in separation from water, which water was drawn off.

Taking 50 grams of the condensate thus formed, I mixed with it 154 grams of high test glycerin, forming a homogeneous mass of the glycerin and condensate. To this homogeneous mass I then added 148 grams of phthalic anhydride, and brought the temperature of the mixture to about 320° F. The resultant product, when subjected to continued heating at higher temperature and allowed to gel, was a clear resinous material of molding and casting type, but less brittle than the simple phenol-formaldehyde resin which it contained.

By adding a monocarboxylic acid to this reaction product, when it was at the stage of forming a clear bead, but prior to gelation, in the manner described in Example No. 2, the reaction product of phenol and formaldehyde may be modified similarly to the phenol-aldehyde-alkyd product formed by the meta-para-cresol-formaldehyde condensation of Example No. 1, and this in turn I found to be susceptible to further modification in the manner described in Example No. 3. In each stage the resultant product was substantially identical with those formed when utilizing the meta-para-cresol-formaldehyde of Example No. 1.

Example No. 8

Taking 50 grams of condensate made in substantial accordance with the procedure of Example No. 1, I added to it first 154 grams of glycerin, and then 95 grams of maleic anhydride, bringing the temperature of 320° F. Upon continued heating to the point of gelation, a product generally analgous to that obtained by following the procedure of Example No. 1 was produced. By addition of a polycarboxylic acid when the mixture was in condition to form a clear bead, but prior to gelation, a product analgous to that of Example No. 2 was formed.

Example No. 9

Taking 50 grams of condensate made in substantial accordance with the procedure of Example No. 1, I added to it first 154 grams of glycerin, and then 113 grams of fumaric acid, bringing the temperature to 320° F. Upon continued heating to the point of gelation, a product generally analogous to that obtained by following the procedure of Example No. 1 was produced. By addition of a polycarboxylic acid when the mixture was in condition to form a clear bead, but prior to gelation, a product analogous to that of Example No. 2 was formed.

It has been noted that the temperature at which condensation takes place should be relatively low, being for example of an order exemplified by reflux conditions, as in Example No. 1, in order that the condensate, although capable of hardening, may not harden so rapidly after its dehydration, and upon subsequent heating, as to inhibit the formation of a reactive mixture by addition of the polyhydric alcohol and polycarboxylic acid. In subsequent stages, the same general control is of similar importance, temperature being so controlled as to prevent premature gelation, and any reagent or modifying material being added before continued heating has carried the body of material to the stage of gelation.

In each stage of my process, therefore, care should be taken in raising the temperature of the mixture higher than I have given for that stage of the process, that premature gelation is not caused.

It is a feature of my invention that the phenol-aldehyde condensate, initially made, is of the full heat-hardening, or "Bakelite" type. To this end I use a phenol selected from the group meta-para-cresol, phenol and xylenol; and do not use the phenolics, such as butyl phenol, or para-tertiary amyl-phenol, which tend to give a phenol-aldehyde condensate of less positive heat-hardening properties. Although the condensates formed in the initial stage of my process are insoluble if carried to a high stage of condensation, I have discovered that by controlled heating, by making the condensate with an excess of aldehyde and under definitely alkaline conditions, and by using an excess of glycerin, the several desired modifications may be made.

It also is noteworthy that, by employing an excess of aldehyde and an excess of glycerin, by controlled temperature, and by prompt additions, I may effect the reactions involving the polybasic carboxylic acid and the polyhydric alcohol without including any solubilizing agent, such as an acid or a resin, at that reaction stage. The monocarboxylic acid, which I employ, is added after the polyhydric alcohol and the polybasic carboxylic acid have effected their reactions with each other and with the condensate; at which stage it may react with the excess of polyhydric alcohol.

The result of these several factors is to give a resin, suitable for use in coating compositions, in which the material made in the initial stage is a resin of full heat-hardening properties, the advantageous features of which properties are permitted to develop by omitting solubilizing agents from the reaction mass during those reactions in which the polycarboxylic acid and the polyhydric alcohol are first involved. After modification with the monocarboxylic acid, my product resin thus retains in a resin suitable for coatings the hardness, gloss and alkali resistance characteristic of molding resins of the full heat-hardening, or "Bakelite", type.

The application herein is a continuation in part of my co-pending application Serial No. 192,579, filed February 25, 1938, for an improvement in Resinous product.

I claim as my invention:

1. The herein described method of producing a modified phenol-aldehyde resin by the sequential steps of forming an initial phenol-aldehyde condensate of the infusible type precipitated in refluxing an aldehyde with a phenol selected from the group consisting of meta-para-cresol, phenol, and xylenol in the presence of an alkaline catalyst in the proportion of at least 1.5 mols. of aldehyde to 1 mol. of phenol, forming a homogeneous mass of the condensate and an unmodified polyhydric alcohol and reacting the said mass with a polycarboxylic acid with heating to a temperature of about 320° F. in the absence of a solubilizing agent and holding to a clear bead, in the reaction mass the polyhydric alcohol being in excess of the polycarboxylic acid and both being in excess of the initial condensate, and with heating to a temperature of about 380° F. making to the partial esterification product thus formed at least one addition of drying oil acids.

2. The herein described method of producing a modified phenol-formaldehyde resin by the sequential steps of forming an initial phenol-formaldehyde condensate of the infusible type precipitated in refluxing formaldehyde with a phenol selected from the group consisting of meta-para-cresol, phenol, and xylenol in the presence of an alkaline catalyst in the proportion of at least 1.5 mols. of formaldehyde to 1 mol. of phenol, forming a homogeneous mass of the condensate and an unmodified polyhydric alcohol and reacting the said mass with a polycarboxylic acid with heating to a temperature of about 320° F. in the absence of a solubilizing agent and holding to a clear bead, in the reaction mass the polyhydric alcohol being in excess of the polycarboxylic acid and both being in excess of the initial condensate, and with heating to a temperature of about 380° F. making to the partial esterification product thus formed at least one addition of drying oil acids.

3. The herein described method of producing a modified phenol-aldehyde resin capable of reaction with monocarboxylic acids by the sequential steps of forming an initial phenol-aldehyde condensate of the infusible type precipitated in refluxing an aldehyde with a phenol selected from the group consisting of meta-para-cresol, phenol, and xylenol in the presence of an alkaline catalyst in the proportion of at least 1.5 mols. of aldehyde to 1 mol. of phenol, and forming a homogeneous mass of the condensate and an unmodified polyhydric alcohol and reacting the said mass with a polycarboxylic acid with heating to a temperature of about 320° F. in the absence of a solubilizing agent and holding to a clear bead, in the reaction mass the polyhydric alcohol being in excess of the polycarboxylic acid and both being in excess of the initial condensate.

4. The herein described method of producing a modified phenol-formaldehyde resin capable of reaction with monocarboxylic acids by the sequential steps of forming an initial phenol-formaldehyde condensate of the infusible type precipitated in refluxing formaldehyde with a phenol selected from the group consisting of meta-para-cresol, phenol, and xylenol in the presence of an alkaline catalyst in the proportion of at least 1.5 mols. of formaldehyde to 1 mol. of phenol, and forming a homogeneous mass of the condensate and an unmodified polyhydric alcohol and reacting the said mass with a polycarboxylic acid with heating to a temperature of about 320° F. in the absence of a solubilizing agent and holding to a clear bead, in the reaction mass the polyhydric alcohol being in excess of the polycarboxylic acid and both being in excess of the initial condensate.

SAMUEL S. GUTKIN.